US012651704B2

(12) United States Patent
Lee et al.

(10) Patent No.: US 12,651,704 B2
(45) Date of Patent: Jun. 9, 2026

(54) MULTILAYER ELECTRONIC COMPONENT

(71) Applicant: SAMSUNG ELECTRO-MECHANICS CO., LTD., Suwon-si (KR)

(72) Inventors: Kyung Ryul Lee, Suwon-si (KR); Ki Myoung Yun, Suwon-si (KR); Chan Hee Nam, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 133 days.

(21) Appl. No.: 18/646,249

(22) Filed: Apr. 25, 2024

(65) Prior Publication Data

US 2025/0022656 A1     Jan. 16, 2025

(30) Foreign Application Priority Data

Jul. 14, 2023     (KR) ........................ 10-2023-0091820

(51) Int. Cl.
*H01G 4/12*          (2006.01)
*H01G 4/012*         (2006.01)
*H01G 4/30*          (2006.01)

(52) U.S. Cl.
CPC ........... *H01G 4/1227* (2013.01); *H01G 4/012* (2013.01); *H01G 4/30* (2013.01)

(58) Field of Classification Search
CPC ......... H01G 4/30; H01G 4/1227; H10G 4/012
USPC ..... 361/301.4, 311, 312, 321.1, 321.4, 321.5
See application file for complete search history.

(56) References Cited

U.S. PATENT DOCUMENTS

| | | | | |
|---|---|---|---|---|
| 2016/0181017 A1* | 6/2016 | Kamigaki | ................ | C08K 9/10 |
| | | | | 361/321.1 |
| 2017/0301474 A1* | 10/2017 | Saito | ...................... | H01G 4/232 |
| 2018/0182548 A1 | 6/2018 | Park et al. | | |
| 2019/0066920 A1* | 2/2019 | Kim | .................... | C04B 35/4682 |
| 2021/0249192 A1* | 8/2021 | Kang | ................ | C04B 35/62894 |
| 2022/0157527 A1* | 5/2022 | Yun | ....................... | H01G 4/1227 |
| 2023/0130377 A1* | 4/2023 | Seo | .......................... | H01G 4/30 |
| | | | | 361/301.4 |

FOREIGN PATENT DOCUMENTS

| | | |
|---|---|---|
| KR | 10-2017-0127647 A | 11/2017 |
| KR | 10-2018-0073359 A | 7/2018 |

\* cited by examiner

*Primary Examiner* — Arun Ramaswamy
(74) *Attorney, Agent, or Firm* — Morgan Lewis & Bockius LLP

(57)     ABSTRACT

A multilayer electronic component, may include a body including a dielectric layer and an internal electrode; and an external electrode disposed on the body, wherein the dielectric layer may include a plurality of dielectric grains, at least one of the plurality of dielectric grains may have a core-shell structure including a core portion and a shell portion surrounding at least a portion of the core portion, a cross-section of the core portion may include a polygonal shape, an average length of the plurality of dielectric grains may be 80 nm or more and 200 nm or less, and a length of the core portion, as compared to a length of a corresponding dielectric grain, may be 70% or more.

18 Claims, 6 Drawing Sheets

FIRST
DIRECTION

SECOND
DIRECTION

I − I'

FIRST
DIRECTION

THIRD
DIRECTION          II − II'

P

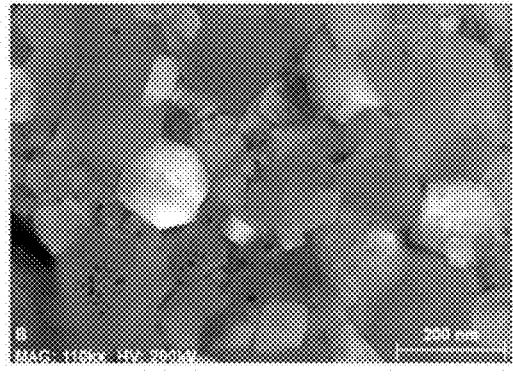
FIG. 8A
FIG. 8B
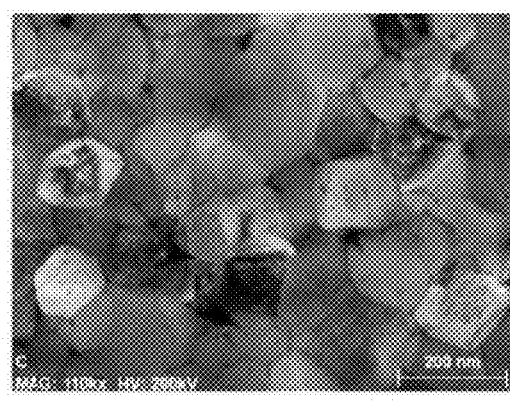
FIG. 8C
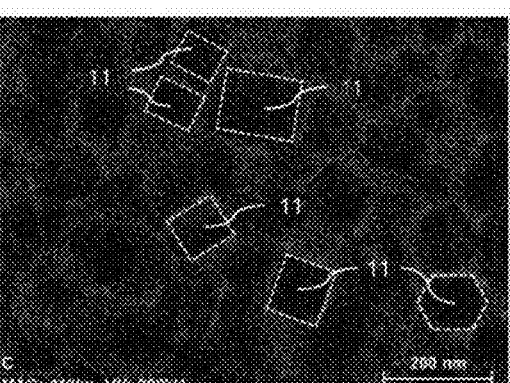
FIG. 8D

MULTILAYER ELECTRONIC COMPONENT

CROSS-REFERENCE TO RELATED APPLICATION(S)

This application claims benefit of priority to Korean Patent Application No. 10-2023-0091820 filed on Jul. 14, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of various types of electronic products, such as an image display device such as a liquid crystal display (LCD) or a plasma display panel (PDP), a computer, a smartphone, a mobile phone, and the like, serving to charge or discharge electricity therein or therefrom.

Such a multilayer ceramic capacitor has a small size, implements high capacitance, and is easily mounted on a circuit board, and may thus be used as a component of various electronic devices. There has been increasing demand for a multilayer ceramic capacitor to have a reduced size and higher capacitance as each of various electronic devices such as a computer and a mobile device have a reduced size and higher output.

Meanwhile, in order to achieve miniaturization and high capacitance of multilayer electronic components, a thin dielectric layer may be applied. However, as the dielectric layer is thinned, an insulation resistance value of the multilayer electronic component may decrease, for example, the number of dielectric grain boundaries may decrease, or electrical conductivity may increase, so that reliability may decrease, and dielectric capacitance characteristics, and DC-bias characteristics may also decrease. Accordingly, research is being actively conducted to increase reliability by improving crystallinity of a core portion corresponding to an inner part of a dielectric material to increase dielectric capacitance, and manufacturing a shell portion corresponding to an outer part thereof to have a relatively high insulation resistance value when an electric field is applied.

SUMMARY

An aspect of the present disclosure is to achieve miniaturization and high capacitance of a multilayer electronic component.

An aspect of the present disclosure is to improve dielectric capacitance characteristics by increasing a fraction of a core portion.

An aspect of the present disclosure is to improve DC-bias characteristics of a multilayer electronic component.

However, the object of the present invention is not limited to the above, and will be more easily understood in the process of describing specific embodiments of the present disclosure.

According to an aspect of the present disclosure, provided is a multilayer electronic component, may include: a body including a dielectric layer and an internal electrode; and an external electrode disposed on the body, in which the dielectric layer may include a plurality of dielectric grains, at least one of the plurality of dielectric grains may have a core-shell structure including a core portion and a shell portion surrounding at least a portion of the core portion, a cross-section of the core portion may include a polygonal shape, an average length of the plurality of dielectric grains may be 80 nm or more and 200 nm or less, and a length of the core portion, as compared to a diameter of a corresponding dielectric grain, may be 70% or more.

According to another aspect of the present disclosure, a multilayer electronic component, may include: a body including a dielectric layer and an internal electrode; and an external electrode disposed on the body, in which the dielectric layer may include a plurality of dielectric grains, wherein at least one of the plurality of dielectric grains may have a core-shell structure including a core portion and a shell portion surrounding at least a portion of the core portion, the core portion may include a polygonal shape, an average length of the plurality of dielectric grains may be 80 nm or more and 200 nm or less, and a volume of the core portion, as compared to a volume of a corresponding dielectric grain, may be 30% or more.

BRIEF DESCRIPTION OF DRAWINGS

The above and other aspects, features, and advantages of the present disclosure will be more clearly understood from the following detailed description, taken in conjunction with the accompanying drawings:

FIG. 8A is an image of dielectric grains of an embodiment of the present disclosure taken through a transmission electron microscope (TEM), FIG. 8B is an image obtained by mapping a specific element by performing EDS analysis on FIG. 8A, FIG. 8C is an image of dielectric grains of an embodiment of the present disclosure taken through a transmission electron microscope (TEM), and FIG. 8D is an image obtained by mapping a specific element by performing EDS analysis on FIG. 8C.

DETAILED DESCRIPTION

Figure 1:
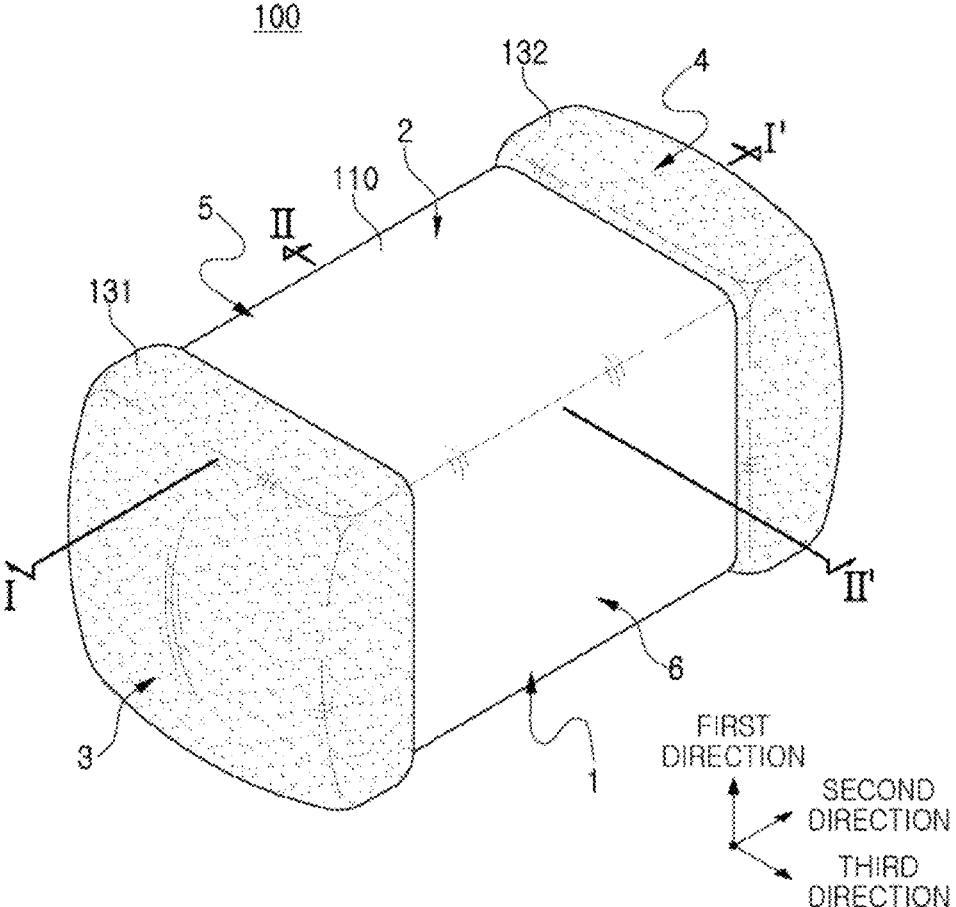
FIG. 1 schematically illustrates a perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "include" or "including," it means that it may further include other components as well, rather than excluding other components, unless specifically stated otherwise.

In the drawings, the first direction may be defined as a stacking direction or a thickness (T) direction, the second direction may be defined as a length (L) direction, and the third direction may be defined as a width (W) direction.

Multilayer Electronic Component

FIG. 1 schematically illustrates a perspective view of a multilayer electronic component according to an embodiment of the present disclosure.

Figure 2:
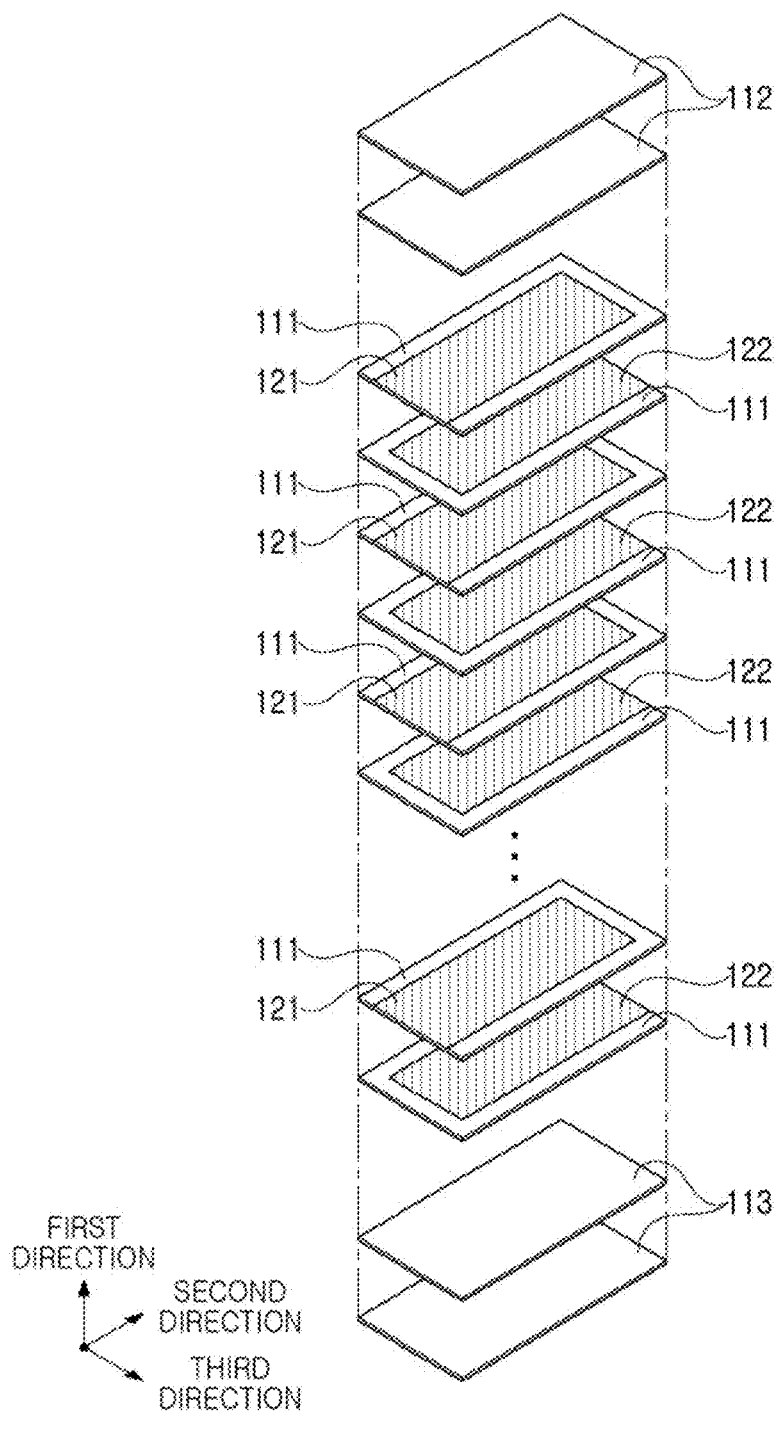
FIG. 2 schematically illustrates an exploded perspective view illustrating a stack structure of internal electrodes.

FIG. 2 schematically illustrates an exploded perspective view illustrating a stack structure of internal electrodes.

Figure 3:
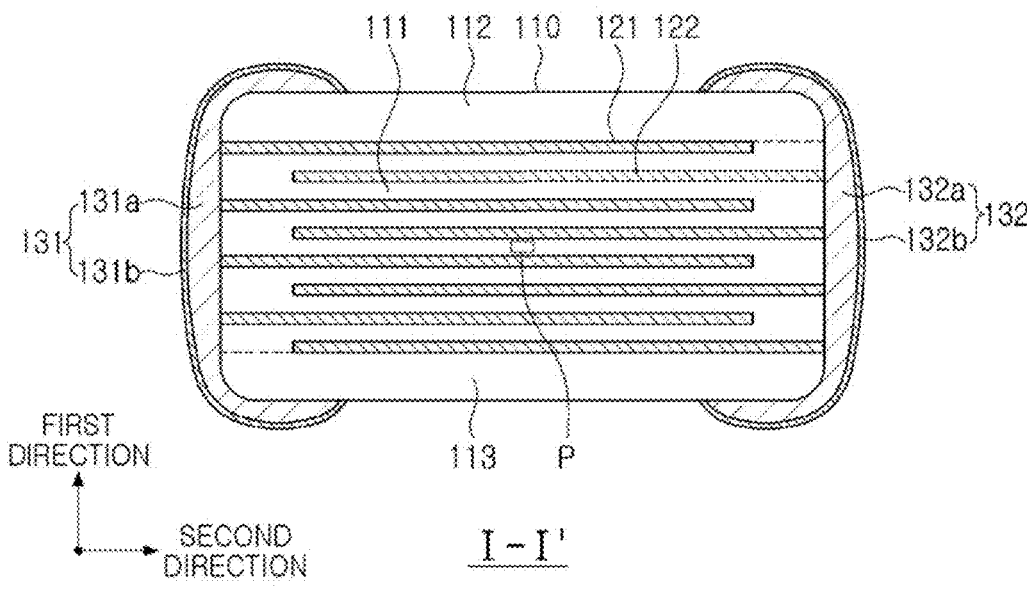
FIG. 3 schematically illustrates a cross-sectional view taken along line I-I' of FIG. 1.

FIG. 3 schematically illustrates a cross-sectional view taken along line I-I' of FIG. 1.

Figure 4:
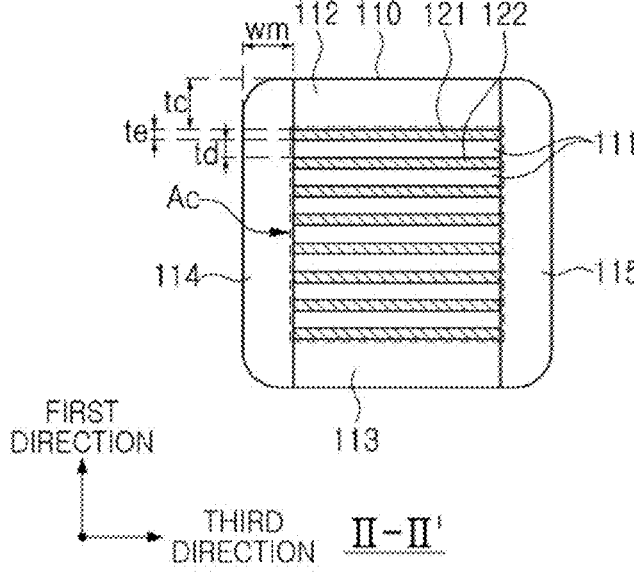
FIG. 4 schematically illustrates a cross-sectional view taken along line II-II' in FIG. 1.

FIG. 4 schematically illustrates a cross-sectional view taken along line II-II' of FIG. 1.

Figure 5:
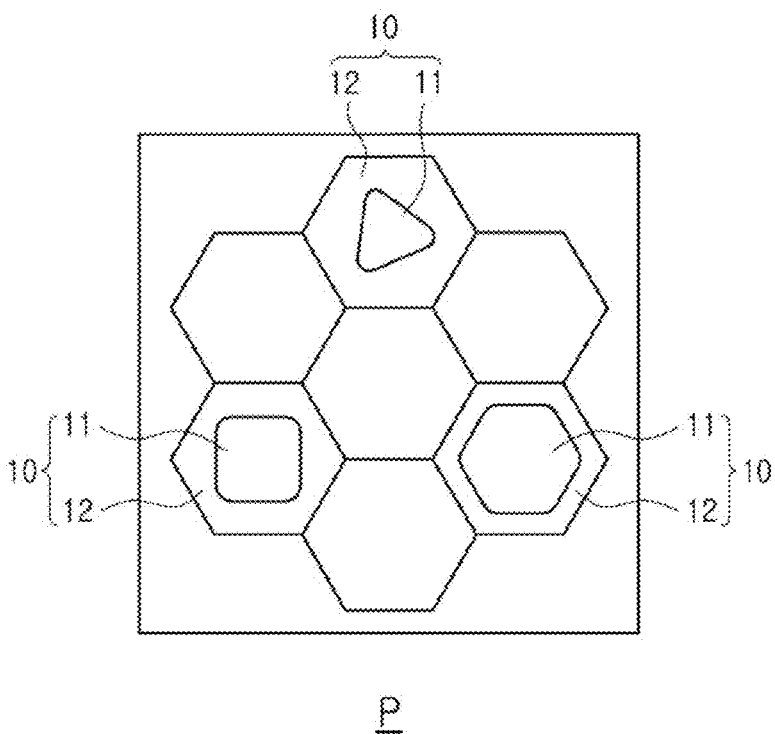
FIG. 5 schematically illustrates an enlarged view of region P in FIG. 3.

FIG. 5 schematically illustrates an enlarged view of region P in FIG. 3.

Figure 6:
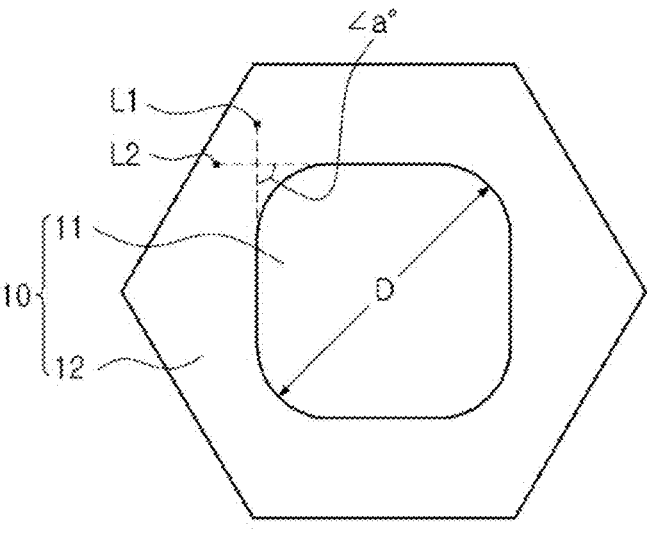
FIG. 6 schematically illustrates dielectric grains of an embodiment of the present disclosure.

FIG. 6 schematically illustrates dielectric grains of an embodiment of the present disclosure.

Figure 7:
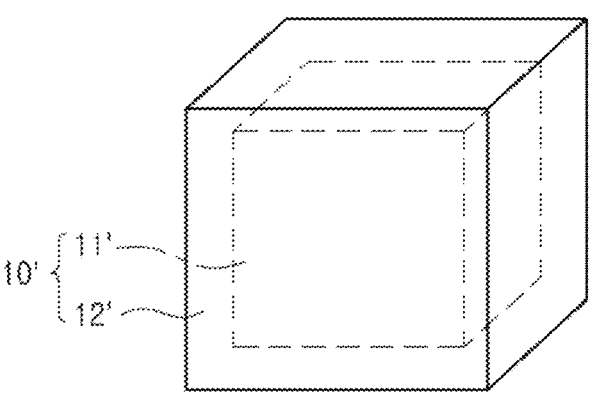
FIG. 7 schematically illustrates dielectric particles.

FIG. 7 schematically illustrates dielectric grains.

Hereinafter, a multilayer electronic component according to an embodiment of the present disclosure will be described with reference to FIGS. 1 to 7. In addition, a multilayer ceramic capacitor will be described as an example of a multilayer electronic component, but in the present disclosure, it may also be applied to various electronic components using a dielectric such as an inductor and piezoelectric elements, varistors, thermistors, or the like.

A multilayer electronic component 100 according to an embodiment of the present disclosure may include: a body 110 including a dielectric layer 111 and internal electrodes 121 and 122; and external electrodes 131 and 132 disposed on the body 110, wherein the dielectric layer 111 may include a plurality of dielectric grains, at least one of the plurality of dielectric grains may have a core-shell structure 10 including a core portion 11 and a shell portion 12 surrounding at least a portion of the core portion 11, a cross-section of the core portion 11 may include a polygonal shape, an average length of the plurality of dielectric grains may be 80 nm or more and 200 nm or less, and a length of the core portion 11, as compared to a diameter of a corresponding dielectric grain 10, may be 70% or less.

The body 110 has a dielectric layer 111 and internal electrodes 121 and 122, alternately stacked.

More specifically, the body 110 may include a capacitance formation portion Ac disposed in the body 110, and including a first internal electrode 121 and a second internal electrode 122 disposed to face each other with the dielectric layer 111 interposed therebetween and having capacitance formed therein.

The body 110 is not limited to a particular shape, and may have a hexahedral shape or a shape similar to the hexahedral shape, as illustrated in the drawings. The body 110 may not have the shape of a hexahedron having perfectly straight lines because ceramic powder particles included in the body 110 are contracted in a process in which the body is sintered. However, the body 110 may have a substantially hexahedral shape.

The body 110 may have first and second surfaces 1 and 2 facing each other in a first direction, third and fourth surfaces 3 and 4 connected to the first and second surfaces 1 and 2 and facing each other in a second direction, and fifth and sixth surfaces 5 and 6 connected to the first to fourth surfaces 1 to 4 and facing each other in a third direction.

The plurality of dielectric layers 111 forming the body 110 may be in a sintered state, and adjacent dielectric layers 111 may be integrated with each other, such that boundaries therebetween may not be readily apparent without a scanning electron microscope (SEM).

A raw material for forming the dielectric layer 111 is not particularly limited, as long as sufficient electrostatic capacitance may be obtained therewith. In general, a perovskite (ABO$_3$)-based material may be used, for example, the raw material for forming the dielectric layer 111 may be a barium titanate (BaTiO$_3$)-based material, a lead composite perovskite-based material, a strontium titanate (SrTiO$_3$)-based material, or the like. The barium titanate-based material may include BaTiO$_3$-based ceramic powder, and the ceramic powder may be, for example, BaTiO$_3$, (Ba$_{1-x}$Ca$_x$)TiO$_3$, Ba(Ti$_{1-y}$Ca$_y$)O$_3$, (Ba$_{1-x}$Ca$_x$)(Ti$_{1-y}$Zr$_y$)O$_3$ or Ba(Ti$_{1-y}$Zr$_y$)O$_3$, in which calcium (Ca), zirconium (Zr), or the like, are partially dissolved in BaTiO$_3$, and the like.

In addition, a raw material of the dielectric layer 111 may include various ceramic additives, organic solvents, binders, dispersants, and the like, added to powder particles such as barium titanate (BaTiO$_3$) powder particles, or the like, according to an object of the present disclosure.

A thickness "td" of the dielectric layer 111 is not particularly limited.

However, in general, to achieve miniaturization and high capacitance of a multilayer electronic component, the thickness of the dielectric layer may be 0.6 μm or less, preferably 0.45 μm or less, and more preferably 0.4 μm or less.

Here, the thickness "td" of the dielectric layer 111 may refer to a thickness "td" of one dielectric layer 111 disposed between the first and second internal electrodes 121 and 122, but may refer to preferably a thickness "td" of all dielectric layers.

Meanwhile, the thickness "td" of the dielectric layer 111 may refer to a size of the dielectric layer 111 in a first direction. In addition, the thickness "td" of the dielectric layer 111 may refer to an average the thickness "td" of the dielectric layer 111, and an average size of the dielectric layer 111 in the first direction.

The average size of the dielectric layer 111 in the first direction may be measured by scanning an image of a cross-section of the body 110 in first and second directions with a scanning electron microscope (SEM) with a magnification of 10,000. More specifically, an average value of one dielectric layer 111 in the first direction may refer to an average value calculated by measuring a size of one dielectric layer 111 in the first direction at 30 equally spaced points in the second direction from the scanned image. The 30 points having equal intervals may be designated in the capacitance formation portion Ac. In addition, if the average value is measured by extending the average value measurement to 10 dielectric layers 111, the average thickness of the dielectric layer 111 in the first direction may be more generalized.

Meanwhile, to achieve miniaturization and high capacitance of a multilayer electronic component, a thin dielectric layer can be applied. As the dielectric layer is thinned, an insulation resistance value of the multilayer electronic component may decrease, for example, the number of dielectric grain boundaries may decrease, or electrical conductivity may increase, so that reliability may decrease, and dielectric capacitance characteristics, and DC-bias characteristics may also decrease. Accordingly, crystallinity of a core portion corresponding to an inner part of a dielectric material may be improved to increase dielectric capacitance, and a shell part corresponding to an outer part thereof may be manufactured to have a high concentration of additive distribution to have a relatively high insulation resistance value when an electric field is applied, which may increase reliability.

The dielectric material included in the dielectric layer 111, for example, a barium titanate (BaTiO₃)-based dielectric, may generally have a tetragonal crystal lattice structure at room temperature, but a region in which some elements such as additives, or the like are substituted, for example, a shell portion may be transformed into a cubic crystal lattice structure. By transforming the lattice structure of the shell portion in the dielectric material, the structure may be converted into a phase in which a dipole moment due to the tetragonal structure and cubic structure is present, and thereby the dielectric characteristics can be improved.

Accordingly, the dielectric layer 111 of an embodiment according to the present disclosure may include a plurality of dielectric grains, and at least one of the plurality of dielectric grains may have a core-shell structure 10 including a core portion 11 and a shell portion 12 surrounding at least a portion of the core portion 11. That is, it may include dielectric grains having a core-shell structure 10 and dielectric grains not having a core-shell structure.

It is known that effective capacitance of a dielectric is improved when a size of a region with a tetragonal crystal lattice structure is larger than a size of a region with a cubic crystal lattice structure within the dielectric grains. In other words, in the dielectric grains having the same size, a dielectric constant may be improved as a dielectric microstructure has a larger ratio (tetragonal crystal lattice structure size/cubic crystal lattice structure).

The shell region where some elements such as additives, or the like have been substituted, may have a domain wall where defects in the lattice occur due to ionic defects such as oxygen vacancies or defect dipoles in lattice-sized units, and these defective lattices may generate irreversible domain wall motion when an electric field is applied, resulting in a decrease in effective capacitance that can be realized when a voltage is applied. In other words, as the shell region is doped with additives, the insulation resistance characteristics may be improved, thereby increasing reliability, but which may result in a decrease in effective capacitance due to the application of voltage.

Accordingly, when a size of the core increases relative to a size of the dielectric grains, the effective capacitance may be improved when a DC-Bias voltage is applied.

In the present disclosure, by controlling a shape of the core within the dielectric grains to maximize a room temperature dielectric constant, dielectric capacitance characteristics, or effective capacitance when a voltage is applied, it may be controlled to minimize a grain growth rate, and thus dielectric capacitance may be secured, a dielectric constant reduction rate improved, and DC-Bias characteristics may be improved.

The dielectric grains contained in the dielectric layer may have a three-dimensional shape. As the conventional core portion has a spherical shape (circular cross-section), a fraction of the core portion may be relatively reduced due to grain growth, and as sintering is performed at a low temperature due to relatively high surface energy, there may be a concern that dispersibility of additives may decrease or pores may be disposed at a triple point of a dielectric grain boundary, thereby reducing reliability.

On the other hand, the core portion 11 according to an embodiment of the present disclosure may have a hexahedral shape.

Since the core portion 11 of the dielectric grains 10 has a hexahedral shape, the fraction of the core portion 11 in the dielectric grains 10 may be increased and a size fraction thereof with the shell portion 12 may be optimized, and due to thorough sintering during a sintering process, generation of pores may be suppressed, thereby improving dielectric capacitance and reliability.

This may be a result of manufacturing dielectric particles before sintering into a hexahedral shape, then doping with additives, and sintering. More specifically, with reference to FIG. 7, a core portion 11' of dielectric particle 10' before sintering may have a hexahedral shape, and a shell portion 12' of the dielectric particle 10' obtained by doping additives may also have a hexahedral shape, but the present disclosure is not particularly limited thereto.

In the present disclosure, dielectric particles may refer to a dielectric material before sintering, and dielectric grains may refer to a dielectric material after sintering. In addition, a dielectric grain boundary may be disposed between dielectric grains, and a triple point may be disposed at a point in which three or more dielectric grains (or dielectric grain boundaries) are in contact. Unless there are special cases, the definitions of terms described in the present disclosure may follow the definitions of terms generally used in the technical field of the present disclosure.

In general, a size of the core portion observed in the dielectric grains after sintering tends to be determined by a size of the dielectric grains before sintering, and since it can be controlled so as not to little affect a size of a core in an operation of sintering or grain growth, a size and grain growth rate of the dielectric grains before sintering may be predicted as a size of a core of the dielectric grains after sintering.

For the dielectric grains having a fine structure, a dielectric layer 111 located in a center portion of the capacitance formation portion Ac may be easily observed based on a cross-section of the body 110 in the first and second directions, using a scanning electron microscope (SEM) or a transmission electron microscope (TEM), and in this case, a cross-section of the core portion may be exposed.

Accordingly, hereinafter, a shape of the core portion 11 according to an embodiment of the present disclosure will be described based on the cross-section.

The cross-section of the core portion 11 according to an embodiment of the present disclosure may include various polygonal shapes. In other words, the cross-section of the core portions 11 of the plurality of dielectric grains may have different polygonal shapes from each other.

Since the cross-section of the core portion 11 has a polygonal shape, the core portion 11 may have a high fraction in the dielectric grains 10 having a core-shell structure, and thus the dielectric capacitance and DC-bias characteristics may be improved.

In the present disclosure, a polygon does not only mean a polygon formed of straight lines, but also mean to include a polygon with rounded corners (no vertices), and include an actual polygonal shape.

Here, the polygon may include at least one of triangles including equilateral and isosceles triangles, squares including squares, rectangles, rhombuses, trapezoids, equilateral trapezoids, and parallelograms, pentagon, and hexagons. Depending on the definition of a polygon, the sum of inner angles of the polygon may substantially be at least one of 180°, 360°, 540°, and 720°, but the present disclosure is not particularly limited thereto. Here, the fact that the sum of the inner angles is substantially at least one 180°, 360°, 540°, and 720° may mean that an error of approximately +5° is included.

In particular, the polygon in the present disclosure may mean a polygon obtained from a cross-section of a cube.

In addition, at least a portion of a cross-sectional shape of the core portion 11 may substantially be parallel to a dielectric grain boundary. As a result, the dielectric characteristics may be improved compared to a circular cross-section of the core portion.

Here, the fact that at least a portion of the cross-sectional shape of the core portion 11 is substantially parallel to the dielectric grain boundary may mean that one boundary line between the core portion 11 and the shell portion 12 is substantially parallel to the dielectric grain boundary. Being substantially parallel may not mean that being absolutely parallel, but may mean that 50% or more of one side (imaginary straight line) of the core portion 11, which is a boundary line between the core portion 11 and the shell portion 12, to be described later, may substantially be parallel to the dielectric grain boundary.

When described with reference to an embodiment of the present disclosure, FIG. 8A is an image taken through a transmission electron microscope (TEM) of a dielectric grain of an embodiment of the present disclosure, FIG. 8B is an image obtained by mapping the element dysprosium (Dy) by performing Energy Dispersive X-ray Spectrometer (EDS) analysis on FIG. 8A, FIG. 8C is an image taken through a transmission electron microscope (TEM) of dielectric grains of an embodiment of the present disclosure, and FIG. 8D is an image of dysprosium (Dy) element obtained by mapping by performing EDS analysis on FIG. 8C.

As can be seen in FIGS. 8B and 8D, at least one of the plurality of dielectric grains included in the image having a size of 1.0 μm horizontal×0.6 μm vertical may have a core-shell structure, and it can be seen that there are multiple polygonal core parts of different shapes.

The inner angle of the polygon may be obtained by measuring an angle (∠a°) between straight lines L1 and L2 obtained by extending different sides, based on a cross-section of the core portion 11 taken with a scanning electron microscope (SEM) or transmission electron microscope (TEM).

Here, a side of the polygon may mean a straight line having a length of 50% or more based on a minimum length passing through a center of the core portion 11 of the corresponding dielectric grain, and the polygon may mean a shape in which the cross-section of the core portion 11 includes three or more sides, and preferably, may mean a shape in which the cross-section of the core portion 11 includes three or more and six or less sides, but the present disclosure is not limited thereto.

Meanwhile, a volume fraction of the core portion 11, as compared to a volume of a corresponding dielectric grain 10 may be preferably 30% or more.

The volume fraction of the core portion 11, as compared to the volume of the corresponding dielectric grain 10 of the core-shell structure may be 30% or more, so that target dielectric capacitance and a room temperature dielectric constant may be achieved, and DC-Bias characteristics can be improved.

When the volume fraction of the core portion 11 is 30% or less, the dielectric properties of the core portion 11 may be insufficient, which may result in a decrease in dielectric constant, and there may be a concern that DC-bias characteristics or high-temperature reliability may be deteriorated.

A length of the core portion 11, as compared to a length of a corresponding dielectric grain 10 may be 70% or more.

Here, the length of the core portion 11 may refer to a maximum length D having the longest length among straight lines passing through the center of the core portion 11. In addition, the length of the corresponding dielectric grain 10 composing the core portion 11 may mean including a straight line obtained by extending a straight line passing through the maximum length of the core portion 11, and may mean a value obtained by adding the lengths of the core portion 11 and the shell portion 12.

The length of the core portion 11, as compared to the length of the corresponding dielectric grain 10 of the core-shell structure may be 70% or more, so that target dielectric capacitance and a room temperature dielectric constant may be achieved, and DC-Bias characteristics can be improved.

When the length of the core portion 11, as compared to a diameter of the corresponding dielectric grain 10 of the core-shell structure is less than 70%, it may be difficult to form sufficient dielectric capacitance, and there may be a concern that DC-Bias characteristics may be deteriorated.

In addition, the length of the core portion 11, as compared to the length of the corresponding dielectric grain 10 may be 95% or less, or 90% or less, but the present disclosure is not particularly limited thereto. This may cause a problem of reduced reliability when a region of the shell portion 12 becomes insufficient, so that it is expected that it may be preferable to form the shell portion 12 to a level at which reliability is not deteriorated, so an example of the upper limit value is provided.

The shell portion 12 may include rare earth elements, and a concentration of the rare earth elements of the shell portion 12 may be higher than that of the core portion 11.

The rare earth elements may include at least one of yttrium (Y), dysprosium (Dy), holmium (Ho), erbium (Er), gadolinium (Gd), cerium (Ce), neodymium (Nd), samarium (Sm), terbium (Tb), tholium (Tm), lanthanum (La), and ytterbium (Yb).

Meanwhile, the core portion 11 and the shell portion 22 may be distinguished through analysis of Scanning Electron Microscopy-Energy Dispersive X-ray Spectroscopy (SEM-EDS) or Transmission Electron Microscopy-Energy Dispersive Spectroscopy (SEM-EDS), and the core portion 11 and the shell portion 22 may be distinguished by measuring a content of rare earth elements contained in the dielectric grains of the core-shell structure.

For example, dysprosium (Dy), a type of rare earth elements, which is difficult to diffuse into the core portion, so during EDS analysis of dielectric grains, a region in which Dy is not diffused may be defined as a core portion, and a region covering or surrounding the core portion may be defined as a shell portion. In other words, a region from the outside of the core portion in which the concentration of rare earth elements is measured to be relatively high to the dielectric grains may be defined as a shell portion.

Alternatively, in one dielectric grain having a core-shell structure, when analyzed using a line profile, a region with a low Dy content may be defined as a core portion, and a region with a low Dy content may be defined as a shell portion, based on a point in which the Dy content changes rapidly.

The dielectric grains according to an embodiment of the present disclosure may have an average length of 80 nm or more and 200 nm or less.

The average length of the dielectric grains may be 80 nm or more and 200 nm or less, so that a dielectric constant or dielectric capacitance may be excellent even in a dielectric layer having an average thickness of 0.45 μm or less.

When the average length of the dielectric grains is less than 80 nm, there may be a concern that sufficient dielectric capacitance may not be secured or a temperature coefficient of capacitance (TCC) may be reduced, and when the average length of the dielectric grains exceeds 200 nm, insulation resistance characteristics may be deteriorated.

In an embodiment of the present disclosure, when the average thickness of the dielectric layer "te" is 0.45 μm or less, the average length of the dielectric grains is 80 nm or more and 200 nm or less, and a cross-section of the core portion 11 of the dielectric grains includes a polygon, dielectric characteristics or DC-Bias characteristics may be further improved.

Here, the average length of the dielectric grains may be an average value obtained by measuring a maximum diameter of dielectric grains observed in an image taken using a scanning electron microscope (SEM) or a transmission electron microscope (TEM) in an arbitrary 10 μm×10 μm region in the dielectric layer of the capacitance formation portion (Ac). In this case, the average length of the dielectric grains may be calculated by including not only the dielectric grains 10 having a core-shell structure, but also dielectric grains not having a core-shell structure.

Internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to face each other with the dielectric layer 111 interposed therebetween, and may be respectively exposed to the third and fourth surfaces 3 and 4 of the body 110.

More specifically, the first internal electrode 121 may be spaced apart from the fourth surface 4 and exposed through the third surface 3, and the second internal electrode 122 may be spaced apart from the third surface 3 and exposed through the fourth surface 4. A first external electrode 131 may be disposed on the third surface 3 of the body and connected to the first internal electrode 121, and a second external electrode 132 may be disposed on the fourth surface 4 of the body and connected to the second internal electrode 122.

That is, the first internal electrode 121 may not be connected to the second external electrode 132, and may be connected to the first external electrode 131, and the second internal electrode 122 may not be connected to the first external electrode 131, and may be connected to the second external electrode 132. In this case, the first and second internal electrodes 121 and 122 may be electrically separated from each other by the dielectric layer 111 disposed in a middle.

Meanwhile, the body 110 may be formed by alternately laminating a ceramic green sheet on which the first internal electrode 121 is printed and a ceramic green sheet on which the second internal electrode 122 is printed, followed by sintering.

A material for forming the internal electrodes 121 and 122 are not particularly limited, and as the material, a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti) and alloys thereof on a ceramic green sheet. A method for printing the conductive paste for the internal electrodes may be a screen printing method, a gravure printing method, or the like, but the present disclosure is not limited thereto.

Meanwhile, a thickness "te" of the internal electrodes 121 and 122 need not be particularly limited.

However, in order to more easily achieve miniaturization and high capacitance of multilayer electronic components, the thickness of the internal electrodes 121 and 122 may be 0.6 μm or less, preferably 0.45 μm or less, and more preferably 0.4 μm or less.

Here, the thickness "te" of the internal electrodes 121 and 122 may mean a size of the internal electrodes 121 and 122 in a first direction. In addition, the thickness "te" of the internal electrodes 121 and 122 may mean an average thickness "te" of the internal electrodes 121 and 122, and may mean an average size of the internal electrodes 121 and 122 in the first direction.

The average size of the internal electrodes 121 and 122 in the first direction may be measured by scanning an image of a cross-section of the body 110 in first and second directions with a scanning electron microscope (SEM) with a magnification of 10,000. More specifically, an average value of one internal electrode may be an average value calculated by measuring the size thereof in the first direction at 30 equally spaced points in the second direction from the scanned image. The 30 points having equal intervals may be designated in the capacitance formation portion Ac. In addition, if the average value is measured by extending the average value measurement to 10 internal electrodes, the average size of the internal electrodes 121 and 122 can be more generalized.

Meanwhile, the body 110 may include cover portions 112 and 113 disposed on both end surfaces of the capacitance formation portion Ac in the first direction.

More specifically, the cover portions 112 and 113 may include an upper cover portion 112 disposed above the capacitance formation portion Ac in the first direction and a lower cover portion 113 disposed below the capacitance formation portion Ac in the first direction.

The upper cover portion 112 and the lower cover portion 113 may be formed by laminating a single dielectric layer 111 or two or more dielectric layers 111 on the upper and lower surfaces of the capacitance formation portion Ac in a first direction, respectively, and the upper cover portion 112 and the lower cover portion 113 may serve to basically prevent damage to the internal electrodes 121 and 122 due to physical or chemical stress.

The upper cover portion 112 and the lower cover portion 113 may not include the internal electrodes 121 and 122, and may include the same material as that of the dielectric layer 111. That is, the upper cover portion 112 and the lower cover portion 113 may include a ceramic material, for example, a barium titanate ($BaTiO_3$)-based ceramic material.

Meanwhile, a thickness "tc" of the cover portions 112 and 113 need not be particularly limited.

However, in order to more easily achieve miniaturization and high capacitance of the multilayer electronic component, the thickness "tc" of the cover portions 112 and 113 may be 100 μm or less, preferably 30 μm or less, and more preferably 20 μm or less in ultra-small products.

Here, the thickness "tc" of the cover portions 112 and 113 may mean a size of the cover portions 112 and 113 in the first direction. In addition, the thickness "tc" of the cover portions 112 and 113 may mean an average thickness "tc" of the cover portions 112 and 113, and may mean an average size of the cover portions 112 and 113 in the first direction.

The average thickness of the cover portions 112 and 113 in the first direction may be measured by scanning an image of a cross-section of the body 110 in the first and second directions with a scanning electron microscope (SEM) with a magnification of 10,000. More specifically, the average size may be an average value calculated by measuring the size thereof at 30 equally spaced points in the second direction from a scanned image of one cover portion.

In addition, the average size of the cover portion in the first direction measured by the above-described method may have substantially the same as the average size of the cover portion in the first direction, in a cross-section of the body 110 in first and third directions.

Meanwhile, side margin portions 114 and 115 may be disposed on both end surfaces of the body 110 in the third direction.

More specifically, the side margin portions 114 and 115 may include a first side margin portion 114 disposed on the fifth surface 5 of the body 110 and a second side margin portion 115 disposed on the sixth surface 6 thereof. That is, the side margin portions 114 and 115 may be disposed on both end surfaces of the body 110 in the third direction.

As illustrated, the side margin portions 114 and 115 may refer to regions between both ends of the internal electrodes 121 and 122 in the third direction and a boundary surface of the body 110, based on the cross-section of the body 110 in the first and third directions.

The side margin portions 114 and 115 may basically serve to prevent damage to the internal electrodes 121 and 122 due to physical or chemical stress.

The side margin portions 114 and 115 may be formed by applying a conductive paste to the ceramic green sheet, except where margin portions 114 and 115 are to be formed, to form internal electrodes 121 and 122, and in order to suppress a step by the internal electrodes 121 and 122, after the internal electrodes 121 and 122 are cut so as to be exposed to the fifth and sixth surfaces 5 and 6 of the body 110 after lamination, the side margin portions 114 and 115 may also be formed by laminating a single dielectric layer 111 or two or more dielectric layers 111 on both end surfaces of the capacitance formation portion Ac in the third direction.

The first side margin portion 114 and the second side margin portion 115 may not include internal electrodes 121 and 122, and may include the same material as that of the dielectric layer 111. That is, the first side margin portion 114 and the second side margin portion 115 may include a ceramic material, for example, a barium titanate ($BaTiO_3$)-based ceramic material.

Meanwhile, a width "wm" of the first and second side margin portions 114 and 115 need not be particularly limited.

However, in order to more easily achieve miniaturization and high capacitance of the multilayer electronic component 100, the width "wm" of the first and second side margin portions 114 and 115 may be 100 μm or less, preferably 30 μm or less, and more preferably 20 μm or less in ultra-small products.

Here, the width "wm" of the side margin portions 114 and 115 may mean a size of each of the side margin portions 114 and 115 in a third direction. In addition, the width "wm" of the side margin portions 114 and 115 may mean an average width "wm" of the side margin portions 114 and 115, and may mean an average size of the side margin portions 114 and 115 in the third direction.

The average size of the side margin portions 114 and 115 in the third direction may be measured by scanning an image of a cross-section of the body 110 in the first and third directions with a scanning electron microscope (SEM) at a magnification of 10,000. More specifically, the average size may refer to an average value calculated by measuring a size of one side margin portion in the third direction at equally spaced 10 points in the first direction.

A structure, in which the multilayer electronic component 1000 has two external electrodes 131 and 132, has been described in the present embodiment. However, the number and shape of the external electrodes 131 and 132 may vary depending on the shape of the internal electrodes 121 and 122 or other objects.

External electrodes 131 and 132 may be disposed on the body 110 and connected to the internal electrodes 121 and 122.

More specifically, the external electrodes 131 and 132 may be respectively disposed on the third and fourth surfaces 3 and 4 of the body 110, and may include first and second external electrodes 131 and 132 respectively connected to the first and second internal electrodes 121 and 122. That is, the first external electrode 131 may be disposed on the third surface 3 of the body and connected to the first internal electrode 121, and the second external electrode 132 may be disposed on the fourth surface 4 of the body and connected to the second internal electrode 122.

The external electrodes 131 and 132 may be formed using any material as long as it has electrical conductivity, such as metal. A specific material thereof may be determined by considering electrical characteristics, structural stability, and the like, and may further have a multi-layer structure.

For example, the external electrodes 131 and 132 may include electrode layers 131a and 132a disposed on the body 110 and plating layers 131b and 132b disposed on the electrode layers 131a and 132a.

The electrode layers 131 and 132 may be sintered electrodes including a conductive metal and glass or resin-based electrodes including a conductive metal or a resin.

In addition, the electrode layers 131a and 132a may be formed by sequentially forming a sintered electrode and a resin-based electrode on the body 110.

In addition, the external electrodes 131 and 132 may have a form in which sintered electrodes and resin-based electrodes are sequentially formed on the body. In addition, the external electrodes 131 and 132 may be formed by a method of transferring a sheet including a conductive metal onto the body, or may be formed by a method of transferring a sheet including a conductive metal onto a sintered electrode.

The conductive metal used for the electrode layers 131a and 132a is not particularly limited as long as it is a material that can be electrically connected to the internal electrodes 121 and 122 to form capacitance, and may include, for example, nickel (Ni), copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding a glass frit to the conductive metal powder and then sintering the same.

The plating layers 131b and 132b may serve to improve mounting characteristics.

The type of the plating layers 131b and 132b is not particularly limited, and may be a single layer of plating layers 131b and 132b containing at least one of nickel (Ni), tin (Sn), palladium (Pd), and alloys thereof, and may be formed of multiple layers.

For a more specific example of the plating layers 131b and 132b, the plating layers 131b and 132b may be Ni plating layers or Sn plating layers, and the plating layers 131b and 132b may have a form in which a Ni plating layer and a Sn plating layer are sequentially formed on the plating layers 131a and 132a, and a form in which a Sn plating layer, a Ni plating layer, and a Sn plating layer are sequentially formed. In addition, the plating layers 131b and 132b may include a plurality of Ni plating layers and/or a plurality of Sn plating layers.

A size of the multilayer electronic component 100 does not need to be particularly limited.

However, to achieve both miniaturization and high capacitance, since the number of laminated layers should be increased by thinning a dielectric layer and internal electrodes, a reliability improvement effect according to the present disclosure may become more remarkable in the multilayer electronic component 100 having a size of 3216 (length×width, 3.2 mm×1.6 mm) or less, preferably 1005 (length×width, 1.0 mm×0.5 mm) or less.

Hereinafter, the present disclosure will be described in more detail through Examples, but these are intended to aid specific understanding of the disclosure, and the scope of the present disclosure is not limited by the Examples.

Example

As a main component base material, cube-shaped BaTiO₃ particles with an average particle size of 100 nm to form a core portion and BaTiO₃ spherical particles with an average particle size of 10 nm to form a shell portion were mixed according to a design ratio and used. Using zirconia beads as a mixing/dispersing medium, additive particles such as dysprosium (Dy), an ethanol/toluene solvent, cube-shaped and spherical BaTiO₃, and a dispersant were mixed together and milled for 5 hours, and a binder was mixed and then additionally milled for 5 hours. A slurry prepared in this manner was used to manufacture a molded sheet with a thickness of 0.8 μm and 0.6 μm using a molding machine for preparing a sheet. Nickel (Ni) internal electrodes were printed on the molded sheet. Upper and lower cover portions were manufactured by respectively laminating 25 layers of covers sheets with an average thickness of 10 μm to 13 μm, and a sheet in which 31 layers of nickel (Ni) internal electrodes are printed were pressed and then laminated to manufacture a bar. The pressed bar was cut into chips to have a size 3216 (length×width: 3.2 mm×1.6 mm) using a cutter. The manufactured MLCC chip having a size of 3216 was plasticized and sintered under conditions at a temperature of 1100 to 1150° C. in a reducing atmosphere of 0.1% H2/99.9% N2 to 0.5% H2/99.5% N2 (H2O/H2/N2 atmosphere) for a maintenance time of 10 minutes, and then re-oxidized in an N2 atmosphere at 1150° C. for 0.5 hours. Here, 0.1% hydrogen concentration corresponds to a condition of electromotive force of 670 mV and 0.5% hydrogen concentration corresponds to a condition of electromotive force of 760 mV in a measurement environment of 850° C. with an oxygen partial pressure measuring device. For the fired chip, external electrodes were completed through a termination process and electrode sintering using a copper (Cu) paste. Accordingly, an MLCC chip having a 3216 size, in which a thickness of the dielectric layer after sintering (meaning a dielectric layer disposed between internal electrodes) is approximately 0.4 μm and the number of dielectric layers is 30, was manufacture.

Room temperature capacitance and dielectric loss of the MLCC chip were measured at 1 KHz and AC 0.5 V/μm conditions using an LCR meter. A dielectric constant of a dielectric of the MLCC chip dielectric was calculated from the capacitance, dielectric thickness, internal electrode area, and number of laminated layers of the MLCC chip. Room temperature insulation resistance was measured after 60 seconds by taking 10 samples each and applying DC 10V/μm thereto. The change in capacitance according to temperature was measured in the temperature range of −55° C. to 105° C. A Highly Accelerated Life Time Test (HALT) was performed by applying a voltage corresponding to an electric field of 23 V/μm at a temperature of 125° C. for 40 samples per each test sample (Comparative Example and Example) and measuring a time for failure to occur, to calculate a Mean Time to Failure (MTTF). In addition, a DC bias change rate of the capacitance was measured with DC voltages of 1 V and 3 V applied to the chip.

In Comparative Example, conventional circular dielectric particles were used, and as a result of TEM-EDS observation, it was confirmed that a shape of the core portion after sintering was substantially circular, and a core portion of different polygonal shape was not included.

In Example, hexahedral dielectric particles of the present disclosure were used, and as a result of TEM-EDS observation, it was confirmed that a plurality of core portions had different polygonal shapes after sintering. Manufacturing conditions were the same as in Comparative Example.

The DC-Bias change rate refers to a change rate in dielectric capacitance when a DC voltage of 1V and 3V is applied, respectively, based on the dielectric capacitance when a DC voltage is not applied.

A Highly Accelerated Life Test (HALT) is performed by measuring a Mean Time To Failure (MTTF) when a voltage of 1.5 Vr is applied at a temperature of 125° C. Based on initial insulation resistance (R₀) of 10⁹Ω, when a short occurred, it was determined to be a failure. 400 sample chips were used in both Comparative Examples and Examples, and an average time when all sample chips failed was calculated as MTTF.

TABLE 1

| | Dielectric constant | DC-Bias change rate @1 V | DC-Bias change rate @3 V | Highly Accelerated Life Test (HALT MTTF) (@125° C., 1.5 Vr) |
|---|---|---|---|---|
| Comparative Example | 3230 | −27% | −77% | 32.5 hrs |
| Example | 3810 | −18% | −68% | 54.9 hrs |

As can be seen in Table 1, in the case of Comparative Example, a dielectric constant was 3230, a DC-Bias change rate showed a capacitance change rate of −27% when 1V was applied and a capacitance change rate of −77% when 3V was applied as compared to no voltage applied, and during HALT evaluation, MTTF was measured to be 32.5 hours. On the other hand, in the case of Example, the dielectric constant was 3810, which was improved compared to that of in Comparative Example, and the DC-Bias change rate showed a capacitance change rate of −18% when 1V was applied and a capacitance change rate of −68% when 3V was applied, as compared to no voltage applied, so it can be seen that the capacitance change rate was improved compared to that of in Comparative Example. In addition, during the HALT evaluation, the MTTF was measured to be 54.9 hours, and it can be seen that an average failure time was improved compared to that of in Comparative Example. Therefrom, it can be seen that the dielectric constant and DC-Bias characteristics of the multilayer electronic component including dielectric grains having a core portion having a polygonal shape were improved compared to the stacked electronic component including dielectric grains having a circular core portion.

As set forth above, as one of the various effects of the present disclosure, miniaturization and high capacitance of a multilayer electronic component is achieved.

One of the various effects of the present disclosure is to improve room temperature dielectric constant characteristics of the multilayer electronic component.

One of the various effects of the present disclosure is to improve DC-bias characteristics of the multilayer electronic component.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'one embodiment' used in the present disclosure does not refer to the same embodiment, and is provided to emphasize and describe different unique characteristics. However, one embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, including:
a body including a dielectric layer and an internal electrode; and
an external electrode disposed on the body,
wherein the dielectric layer includes a plurality of dielectric grains,
at least one of the plurality of dielectric grains has a core-shell structure including a core portion and a shell portion surrounding at least a portion of the core portion,
a cross-section of the core portion includes a polygonal shape including at least one of a triangle including an equilateral triangle and isosceles triangle; a rectangle including a square, rectangle, rhombus, trapezoid, equilateral trapezoid, and parallelogram; a pentagon; or a hexagon, an average length of the plurality of dielectric grains is 80 nm or more and 200 nm or less, and
a length of the core portion, as compared to a length of a corresponding dielectric grain, is 70% or more.

2. The multilayer electronic component of claim 1, wherein two or more dielectric grains of the plurality of dielectric grains have the core-shell structure, cross-sections of the respective core portions having different polygonal shapes from one another.

3. The multilayer electronic component of claim 1, wherein a sum of an inner angle of the polygonal shape is substantially at least one of 180°, 360°, 540°, or 720°.

4. The multilayer electronic component of claim 3, wherein the inner angle includes an angle between straight lines obtained by extending different sides.

5. The multilayer electronic component of claim 1, wherein a dielectric grain boundary is disposed between the plurality of dielectric grains, and
at least a portion of the cross-section of the core portion is substantially parallel to the dielectric grain boundary.

6. The multilayer electronic component of claim 1, wherein the shell portion includes rare earth elements.

7. The multilayer electronic component of claim 1, wherein the dielectric layer includes a plurality of dielectric layers, and at least one of the plurality of dielectric layers has an average thickness of 0.45 µm or less.

8. The multilayer electronic component of claim 1, wherein the internal electrode includes a plurality of internal electrodes, and at least one of the plurality of internal electrodes has an average thickness of 0.45 µm or less.

9. The multilayer electronic component of claim 1, wherein the body includes a capacitance formation portion including the dielectric layer and the internal electrode alternately disposed with the dielectric layer in a first direction, and a cover portion respectively disposed on both end surfaces of the capacitance formation portion in the first direction, the body having first and second surfaces facing each other in the first direction, third and fourth surfaces connected to the first and second surfaces and facing each other in a second direction, and fifth and sixth surfaces connected to the first to fourth surfaces and facing each other in a third direction, and
a side margin portion respectively disposed on the fifth and sixth surfaces of the body.

10. The multilayer electronic component of claim 1, wherein the multilayer electronic component has a size of 1005 (length×width: 1.0 mm×0.5 mm) or less.

11. The multilayer electronic component of claim 1, wherein the external electrode includes an electrode layer disposed on the body and connected to the internal electrode, and a plating layer disposed on the electrode layer.

12. A multilayer electronic component, including:
a body including a dielectric layer and an internal electrode; and
an external electrode disposed on the body,
wherein the dielectric layer includes a plurality of dielectric grains,
at least one of the plurality of dielectric grains has a core-shell structure including a core portion and a shell portion surrounding at least a portion of the core portion,
the core portion includes a hexahedral shape,
an average length of the plurality of dielectric grains is 80 nm or more and 200 nm or less, and
a volume of the core portion, as compared to a volume of a corresponding dielectric grain, is 30% or more.

13. The multilayer electronic component of claim 12, wherein two or more dielectric grains of the plurality of dielectric grains have the core-shell structure, cross-sections of the respective core portions having different polygonal shapes from one another.

14. The multilayer electronic component of claim 12, wherein a cross-section of the core portion includes a polygonal shape, the polygonal shape of the core portion including at least one of a triangle including an equilateral triangle and isosceles triangle; a rectangle including a square, rectangle, rhombus, trapezoid, equilateral trapezoid, and parallelogram; a pentagon; or a hexagon.

15. The multilayer electronic component of claim 12, wherein a cross-section of the core portion includes a polygonal shape, and a sum of an inner angle of the polygonal shape is substantially at least one of 180°, 360°, 540°, or 720°.

16. The multilayer electronic component of claim 12, wherein a dielectric grain boundary is disposed between the plurality of dielectric grains, and at least a portion of a cross-section of the core portion is substantially parallel to the dielectric grain boundary.

17. The multilayer electronic component of claim 12, wherein the dielectric layer includes a plurality of dielectric layers, and at least one of the plurality of dielectric layers has an average thickness of 0.45 μm or less.

18. The multilayer electronic component of claim 12, wherein the internal electrode includes a plurality of internal electrodes, and at least one of the plurality of internal electrodes has an average thickness of 0.45 μm or less.

* * * * *